(12) United States Patent
Mutsers

(10) Patent No.: US 6,403,730 B1
(45) Date of Patent: Jun. 11, 2002

(54) FLUIDIZED BED POLYMERIZATION

(75) Inventor: Stanislaus M. P. Mutsers, Geleen (NL)

(73) Assignee: DSM N.V., Heerlen (NL)

(*) Notice: Subject to any disclaimer, the term of this patent is extended or adjusted under 35 U.S.C. 154(b) by 0 days.

(21) Appl. No.: 09/572,927

(22) Filed: May 18, 2000

(30) Foreign Application Priority Data

May 18, 1999 (NL) .............................................. 1012082

(51) Int. Cl.$^7$ ................................................. C08F 2/34

(52) U.S. Cl. ............................. 526/68; 526/78; 526/88; 422/139

(58) Field of Search ............................. 526/68, 78, 88; 422/139

(56) References Cited

U.S. PATENT DOCUMENTS 5,365,889 A * 11/1994 Tang .......................... 122/4 D

* cited by examiner

*Primary Examiner*—David W. Wu
*Assistant Examiner*—William K Cheung
(74) *Attorney, Agent, or Firm*—Pillsbury Winthrop LLP

(57) ABSTRACT

Fluidized bed reactor process for the polymerization of one or more olefin monomers, wherein the reactor comprises a reaction zone which is confined at the underside by a gas distribution plate and at the top side by a virtual end surface, in which, under operating conditions, a fluidized bed is maintained between the underside and the top side, which reactor is provided with a gas inlet which terminates in the reactor below the gas distribution in which the reaction zone is divided into two or more compartments by one or more substantially vertical partition walls extending from a point located above the gas distribution plate to a point located below the end surface.

23 Claims, 5 Drawing Sheets

FLUIDIZED BED POLYMERIZATION

The invention relates to a process for the polymerisation of one or more monomers in a fluidised bed reactor, which reactor comprises a reaction zone which is confined at the underside by a gas distribution plate and at the top side by a virtual end surface, in which a fluidised bed is maintained between the underside and the top side and in which at least part of the gaseous stream withdrawn from the top of the reactor is cooled to a point where the stream partially condenses into a liquid, and in which at least part of the resulting two-phase stream is recycled to the reactor via an inlet which terminates in the reactor below the gas distribution plate.

Gas-phase fluidised bed polymerisation of one or more monomers, like an olefin or olefins, is effected in a usually vertical elongated reactor in which a bed of polymer particles is maintained in fluidised condition with the aid of an ascending gas stream which contains at least the gaseous monomer(s) to be polymerised. The gas stream is passed through a gas distribution plate which separates the lower part of the reactor from the reaction zone proper. In this plate there are provided perforations that suitably distribute the gas stream supplied over the reaction zone. A peripheral section of the gas distribution plate may be sealed so as to obtain a particular pressure drop at a lower flow rate of the gas. In order to prevent polymer particles from building up on such peripheral section, the seal is preferably designed as an inclined wall which extends from the gas distribution plate to the wall of the reactor. The angle of the inclined wall to the gas distribution plate must be greater than the angle of natural repose of the polymer particles in the reactor and, furthermore, is generally at least 30°, preferably at least 40° and more preferably is between 45° and 85°.

The ascending gas stream may optionally contain one or more inert gases and for example hydrogen as a chain length regulator. An important objective of the addition of inert gases is to control the dew point of the gas mixture. Suitable inert gases are for example inert hydrocarbons such as (iso)butane, (iso)pentane and (iso)hexane, but also nitrogen. Such an inert gas may be added to the gas stream as a gas or, in condensed form, as a liquid.

The gas stream is discharged through the top of the reactor and, after certain processing operations, fresh monomer is added to it to make up for the monomer(s) consumed in the polymerisation, and then the gasstream is again supplied to the reactor as (a portion of) the ascending gas stream in order to maintain the bed.

A catalyst is also added to the bed. During the process, under the influence of the catalyst present, fresh polymer is continuously formed and at the same time polymer that has formed is withdrawn from the bed, with the bed volume and mass being kept substantially constant.

The polymerisation is an exothermic reaction. Heat needs to be removed continuously so as to keep the temperature in the reactor at the desired level. Such removal is effected via the gas stream which leaves the reactor at a higher temperature than that at which it is supplied to the reactor. The superficial gas velocity in the reactor cannot be chosen to be arbitrarily large and so no arbitrarily large amount of heat can be removed. The minimum velocity is dictated by the requirement for the bed to remain fluidised. On the other hand, the velocity must not be so large that a significant amount of polymer particles are blown out through the top of the reactor. The aforementioned limits are heavily dependent on the dimensions and the density of the polymer particles present in the bed and can be determined by experiment. Practical values for the superficial gas velocity are between 0.05 and 1.0 m/sec. These requirements are elements which limit the maximum flow rate of the gas stream at the given reactor dimensions and, thus, the maximum attainable heat removal. The maximum allowable amount of heat of reaction produced, and hence the maximum amount of polymer to be produced, are limited likewise.

The detailed design and operation of fluidised bed reactors for the polymerisation of one or more olefin monomers and suitable process conditions are known per se and are described in detail in for example U.S. Pat. No. 4,543,399 and in WO-A-94/28032.

From that same U.S. Pat. No. 4,543,399 it is known to replenish the gas stream discharged from the reactor with fresh monomer(s) and to cool it to a point where the stream partly condenses (the so-called "condensed mode"). The two-phase stream so obtained, which because of the latent heat of evaporation of the liquid phase has a substantially larger heat removal capacity, and so a corresponding cooling capacity, than a stream consisting solely of a gas, is recycled to the bottom of the reactor. The dew point of the two-phase stream must be lower than the temperature in the reaction zone so that the liquid can evaporate in it. In this way, the production capacity of a fluidised bed reactor appears to be substantially higher than that of reactors which use a recycle gas without condensed liquid, said reactor having otherwise equal dimensions. In the known process the maximum amount of liquid in the two-phase stream is 20 wt %. The highest figure quoted in the examples is 11.5 wt %.

From WO-A-94/28032 it is known to separate the liquid from the two-phase stream obtained on cooling of the gas stream to be recycled and to feed said liquid to the reactor separately from the gas stream. The liquid is preferably injected or atomised at a certain height into the fluidised bed proper, optionally with the aid of a gaseous propellant. In this way, according to this publication, it is possible to feed a larger amount of liquid in proportion to the amount of gas being fed. This allows an even larger amount of heat to be removed, so allowing higher polymer production with proportionally higher heat production. WO-A-94/28032 quotes a figure of 1.21 as the maximum permissible ratio of the mass of liquid feed to the mass of the total gas feed, which figure was derived from a simulated experiment.

The present invention relates to a process for the polymerisation of one or more monomers in a specific fluidised bed reactor, which reactor, at given dimensions, allows a higher liquid mass to gas mass ratio in the feed to the reactor than in a reactor according to the prior art, both in cases where the reactors are operated under "condensed mode conditions".

This object is achieved by a process in which the reaction zone of the reactor is divided into two or more compartments by one or more substantially vertical partition walls extending from a point located above the gas distribution plate to a point located below the end surface.

It has been found that when in such a reactor a fluidised bed is maintained that extends, both at the top and bottom, beyond the partition walls, so that the partition walls are submerged in the fluidised bed, more liquid can be supplied in proportion to the total gas feed than in the absence of a partition wall. This increases the heat removal capacity of the process, so allowing higher heat production and hence higher polymer production rates at equal reactor dimensions. Even at a constant liquid to gas mass ratio in the feed to the reactor, the process of the present invention results in a higher productivity of the reactor.

In a reactor according to the prior art the ratio of the height (H) of the fluidized bed to the diameter (D) of the radial cross section (H/D-ratio) usually is 3 to 5 at the most. At higher ratios it has proved impossible to maintain a stable fluidized bed if, besides gas, liquid is fed to the reactor.

An additional advantage of a reactor having at least one partition wall is that it is now possible to choose a higher H/D-ratio for the reactor, for instance, an H/D-ratio of greater than 5, and even up to 20, which is much higher than in the case of the known reactors, while yet maintaining a stable fluidised bed, resulting in a more controlled polymerisation process. This advantage presents major engineering advantages for polymerisation reactors because they are pressure vessels.

A particularly suitable partition wall in the reactor of the invention is a pipe or hollow section placed in vertical position, preferably concentric with the reactor. Since the pipe or hollow section is completely submerged in the fluidised bed, no appreciable pressure differences occur across the wall of the pipe so that the pipe may be of light-duty construction. This applies also to walls of different shapes.

The walls can simply be suspended from a higher section of the reactor, supported by a bottom section or secured to the wall of the reactor. In the present context a hollow section differs from a pipe in terms of the shape of its cross section. The cross section of a pipe is curved, for example circular or elliptical, whilst that of a hollow section is angular, for example triangular, rectangular, octagonal or with more angles, with or without the angles being uniformly divided. The hollow section or the pipe may have a uniform and/or tapered cross-section, for instance a cone shape, including tapering inwardly and outwardly, for instance, in a hyperbolic shape. For conical shapes, it is preferred that the apex angle formed by the walls of pipe or hollow section is generally not more than 5°, preferably not more than 2.5°. Particularly suitable are angles between 0° and 2°. The ratio of the area of the radial cross section of the pipe or hollow section to that of the reactor is between 1:9 and 9:10 and, in order to achieve as high a stability as possible, preferably between 1:5 and 3:4. In the case of a conical pipe or hollow section, the same applies to the average cross-sectional area thereof. The lower end of the pipe or hollow section is located at least 0.1×the diameter of the reaction zone above the gas distribution plate and preferably 3×that diameter at the most. If the dimensions given here are departed from, the favourable effect of the presence of a vertical partition wall is diminished. The upper end is located at least 0.1×the diameter of the reaction zone below the end of that reaction zone and preferably not more than 3×that diameter. It has been found that it is far less critical for the bed to extend further beyond the partition wall at the upper end than at the lower end. The upper end of the partition wall may be lower accordingly as the H/D-ratio of the fluid bed increases. What is stated here on the positioning of the wall in the reaction zone applies also to the vertical partition walls to be explained below.

Another embodiment of a suitable partition wall is a substantially axially oriented flat, curved or folded plate present in the reaction zone. It is preferred for such a partition wall to connect to the inner wall of the reactor although a clearance of up to 10 cm in-between is permissible. In this way, the reaction zone is divided into two or more compartments, which may be differently sized. The area ratio of the radial cross section of a compartment to the radial cross section of the reactor preferably is between 0.1 and 0.9 and more preferably between 0.20 and 0.75. The substantially axially oriented wall should be virtually vertical. Preferably, the partition wall is oriented substantially parallel to the longitudinal axis of the reactor. This should be understood to mean parallel with the axis of the reactor in its vertical position but also out of parallel by not more than 5°, preferably not more than 2.5°.

The aforementioned beneficial effects of a partition wall occur when there is a common inlet for a gas/liquid mixture at the underside of the reactor, as described in U.S. Pat. No. 4,543,399, and also when there is a separate gas and liquid inlet in the fluidised bed, as described in WO-A-94/28032.

In the latter case, the liquid may be supplied to the fluidised bed via the underside of the reactor at one or more points through the gas distribution plate as well as at one or more points through the side wall. It is in any case advantageous to arrange the means of introduction of the liquid in such a way that the bulk of the liquid can be supplied into the fluidised bed in a zone located under or in the central compartment if a pipe or hollow section is employed, or under or into one of the compartments if one or more vertical partition walls are present. In the case of introduction of the liquid via one or more points through the side wall of the reactor, and if the partition wall is a pipe or hollow section, it is advantageous to position the means of introduction so that the liquid can be supplied to the fluidised bed at a point below the lower end of the pipe or hollow section. In that case, for example by suitably choosing the feed velocity, the liquid can be supplied to both the central compartment and the peripheral compartment of the reactor. Preferably, the bulk of the liquid is supplied to the central compartment, located within the pipe or hollow section, inasmuch as the best results are obtained herewith.

In the case that a vertical plate is used as a partition wall, the liquid may be introduced in the aforementioned manner from a height below the lower end of the wall but also via inlets arranged at different heights in the section of the reactor wall which confines the compartment or compartments to which the liquid is to be supplied.

The liquid is preferably injected in finely divided form, preferably in atomised form, optionally with the aid of a propellant, for which purpose for example recycle gas or fresh monomer gas may be used. Injection should take place in such a way that the liquid enters the desired compartment whence it is taken up by an ascending fluidising gas stream. This has been found to be favourable in terms of the amount of liquid that can be supplied to the fluidised bed without sintering of polymer particles or other undesired disturbances occurring in the bed.

Introducing the recycle liquid via several inlets at different heights of the reactor gives the possibility to vary the concentration of the different ingredients of the liquid inlet (through the addition of more or less monomer make up, etc.) which improves the operating window of the polymerisation reaction and therefore broadening the product capabilities of the fluidised bed reactor.

In processes in which the H/D-ratio of the reactor exceeds 5, the means of introducing the liquid may also be positioned above the upper end of the partition wall(s) provided that the distance between the said upper end and the top of the fluidised bed is not less than approx. 2 m.

The process of the present invention has been found to allow the benefits related to the new reactor design to fully manifest themselves. In the process of the invention the reactor can be operated in a stable manner even when the mass ratio of (liquid supplied to the reactor):(amount of gas supplied to the reactor) is higher than 2:1 or even higher than 4:1. The aforementioned ratio is in any case at least 10% and even more than 50% to even more than 100% higher than when the process is operated in a similar reactor without partition wall(s).

The supplied amount of gas includes, besides the gas supplied via the recycle stream, all other gases supplied to the reactor, including at least the propellant and carrier gases that are employed in introducing the catalyst, a catalyst activator and/or other substances desired or needed for the polymerisation and those used for atomising the supplied liquid.

The process according to the present invention is suitable for any kind of exothermic polymerization reaction in the gas phase. Suitable monomer include olefin monomers, polar vinyl monomers, diene monomers and acetylene monomers. The process of the present invention is especially suitable for the manufacture of polyolefins by the polymerisation of one or more olefin monomers, at least one of which is preferably ethylene or propylene. Preferred olefin monomers for use in the process of the present invention are those having from 2 to 8 carbon atoms. However, small quantities of olefin monomers having more than 8 carbon atoms, for example 9 to 18 carbon atoms, can be employed if desired. Thus, in a preferred mode, it is possible to produce homopolymers of ethylene and/or propylene or copolymers of ethylene or propylene with one or more $C_2$–$C_8$ alpha-olefin monomers. The preferred alpha-olefin monomers are ethylene, propylene, butene-1, pentene-1, hexene-1, 4-methylpentene-1, and octene-1. An example of a higher olefin monomer that can be copolymerised with the primary ethylene and/or propylene monomer, or as partial replacement for the $C_2$-$C_8$ monomer is decene-1. Also dienes are suitable, like 1,4-butadiene, 1,6-hexadiene, dicyclopentadiene, ethylidene norbornene and vinyl norbornene.

When the process is used for the copolymerisation of ethylene and/or propylene with other alpha-olefin monomers the ethylene and/or propylene are present as the major component of the copolymer, and preferably are present in an amount at least 70 wt %, more preferably 80 wt % of the total monomers.

The process is particularly suitable for polymerising olefin monomers at a pressure of between 0.5 and 10 Mpa, preferably between 1 and 5 Mpa, and and at a temperature of between 30° C. and 130° C., and particularly between 45° C. and 110° C.

The polymerisation reaction may be carried out in the presence of any catalyst system known in the art (for instance, anionic catalyst, cationic catalyst or free-radical catalyst) suited for the gas phase polymerisation of one or more (olefin) monomers, like a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound); also so-called single site catalyst systems, like metallocene based catalyst systems, are suitable.

The catalyst may also be in the form of a prepolymer powder prepared in a prepolymerisation stage with the aid of a catalyst system described above. The prepolymerisation may be carried out by any known process, for example, polymerisation in a liquid hydrocarbon diluent or in the gas phase using a batch process, a semi-continous process or a continous process.

The invention also relates to a reactor system, suitable for carrying out the process of the present invention. Such a reaction system comprises a fluidised bed reactor, having at the underside a gas distribution plate, having means for the supply of reaction ingredients, having means for withdrawal of a gaseous stream from the top of the reactor, having a cooler/condensor for cooling said gaseous stream to a point where the stream partially condenses into a liquid, and having means for recirculating the stream out of the cooler/condensor to the reactor.

Such a reactor system is known from the art cited above.

The aim of the invention is to provide a reactor system, in which a process for the polymerisation of one or more (olefin) monomers is possible, in which system a higher condensed mode can be applied.

This is achieved in a reactor system, wherein in the reactor the reaction zone is divided into two or more compartments by one or more substantially vertical partition walls, extending from a point located above the gas distribution plate to a point located below the virtual end surface of the fluidised bed under polymerisation conditions.

In particular, said partition wall is a pipe or hollow section, preferably concentric with the reactor. The preferred configurations of the reactor system of the invention are described in greater detail earlier in this specification. In particular, the reactor system of the present invention comprises means for recirculating the stream out of the cooler/condensor to the reactor as a gas/liquid mixture. In another preferred mode, the reactor system also comprises a gas-liquid separator to separate at least part of the condensed liquid out of the resulting two-phase stream from the cooler/condensor and means for introducing at least part of the separated liquid into the fluidised bed reactor.

It should also be appreciated that the present invention is suitable for retrofitting existing reactors by installing one or more partition walls, pipes or hollow sections into the reactor. In particular, a reactor could be retrofitted by installing a pipe, as discussed above, by fixedly attaching the pipe to an internal section of the reactor.

It should be appreciated that retrofitting refers to the process of modifying or otherwise altering a previously utilized reactor, preferably a reactor previously utilized for polymerization reactions and more preferably condensed mode polyolefin polymerization reactions.

The invention is applicable both for so-called "grass-root" installations as well as for debottlenecking existing fluidised bed polymerisation installations. In the last case the full benefit of the invention might not be obtainable, as the capabilities of other units in the total polymerisation system may form a constraint on the maximum productivity of the system. (In other words: the throughput of the polymerisation system as a whole might be hindered by constraints in the system other than in the reactor section.) In situations where a new, integrated, polymerisation process is designed and built ("grass root"), the benefits of the present invention can be fully used and exploited.

BRIEF DESCRIPTION OF DRAWINGS

The invention is elucidated by means of the following drawings, which are not intended to limit the boundaries of the invention.

FIG. 1 shows a reactor body in the form of a vertical cylinder in which 2 is a gas distribution plate which brings about the desired distribution of the fluidising gas introduced into the reactor below the gas distribution plate 2 through feed line 3. In the reaction zone proper 4 the gas stream introduced maintains above the gas distribution plate 2 a fluidised bed of growing polymer particles which extends to below or even to the bottommost part of velocity-reducing zone 5. A cylindrical pipe 6 is concentrically suspended in reaction zone 4 from the wall of reactor 1 with supports 7. Pipe 6 is submerged in the fluidised bed. Zone 5 widens relative to reaction zone 4. In this zone 5 the gas velocity decreases to the point where the gas is unable to substantially entrain any further the polymer particles that have formed in the reaction zone. As a consequence, the recycle stream discharged through discharge line 8 is virtually free from entrained polymer particles. The recycle stream is cooled in heat exchanger 9, compressed in compressor 10 and cooled in heat exchanger 11 to a temperature such that a proportion of the recycle stream condenses to form a two-phase stream. Make-up monomer is added to this two-phase stream through line 12, whereupon the gas-liquid mixture is reintroduced at the bottom of the reactor through line 3. A polymer-gas stream is discharged from the reactor through drain line 13, which can be closed by valve 14. This stream is separated into polymer and gaseous components in separator 15. The polymer is discharged from separator 15 through the bottom and is processed further. Such further processing may involve processes that are known per se and are not shown in the figure, like removal of absorbed or dissolved liquid.

The gaseous components, on being pressurised to the required pressure, are added to the recycle stream in line 8 (not shown in the figure). Besides the monomer, the required catalyst system and, optionally, an activator are supplied to the reactor. Here, too, the catalyst system is preferably supplied directly to the fluidised bed above the gas distribution plate from storage vessel 16 and propelled by an inert gas through line 17, which also terminates below the lower end of pipe 6. The activator can be added to the feed stream in line 3 via metering device 18. If necessary, a propellant is also added to this stream via feed line 19.

Figure 1:
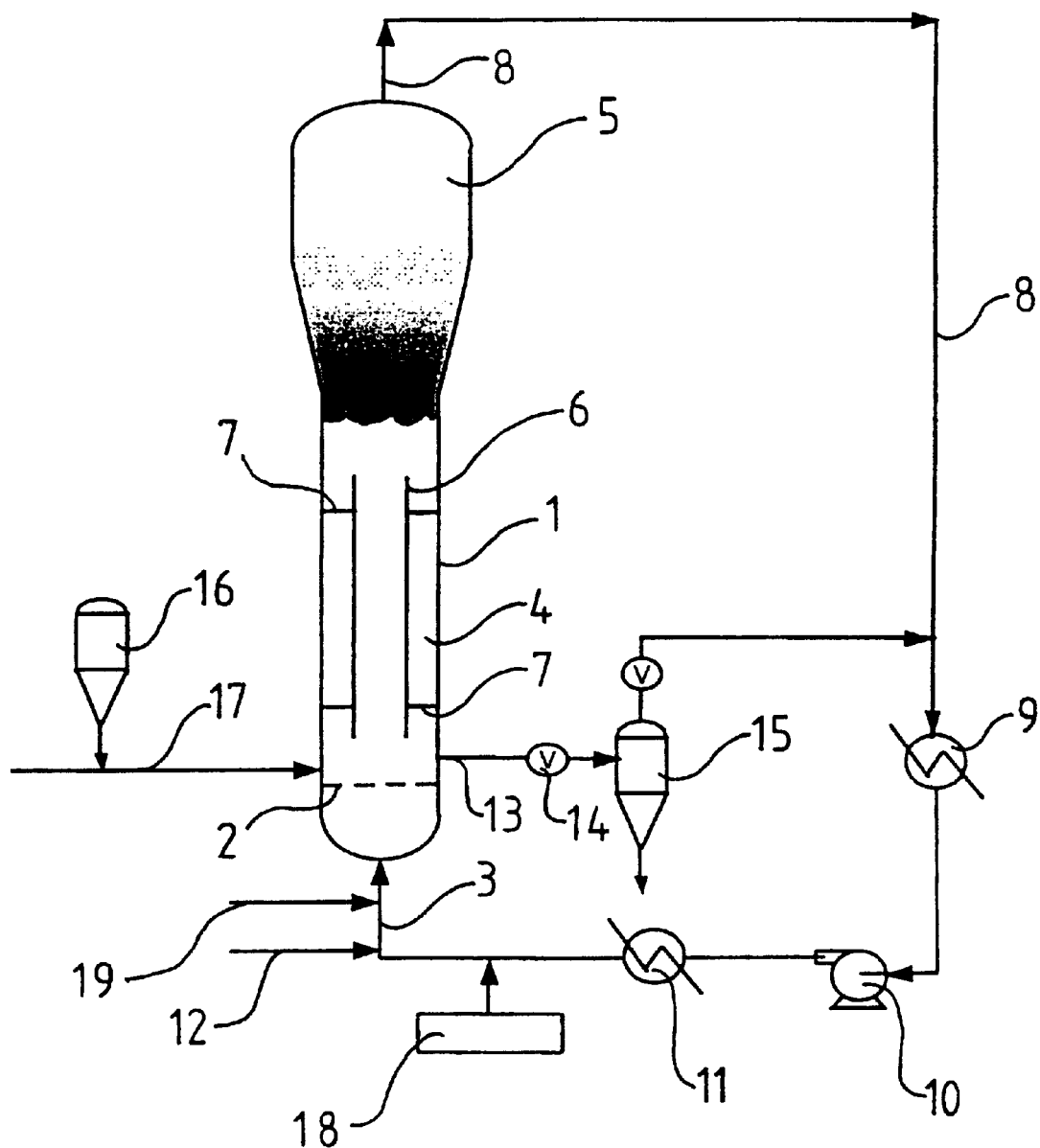
FIG. 1 is an arrangement for polymerising one or more monomers, which includes a first embodiment of the process of the present invention with a reactor having a tubular partition wall and with a common inlet for gas and liquid below the gas distribution plate.
Figure 2:
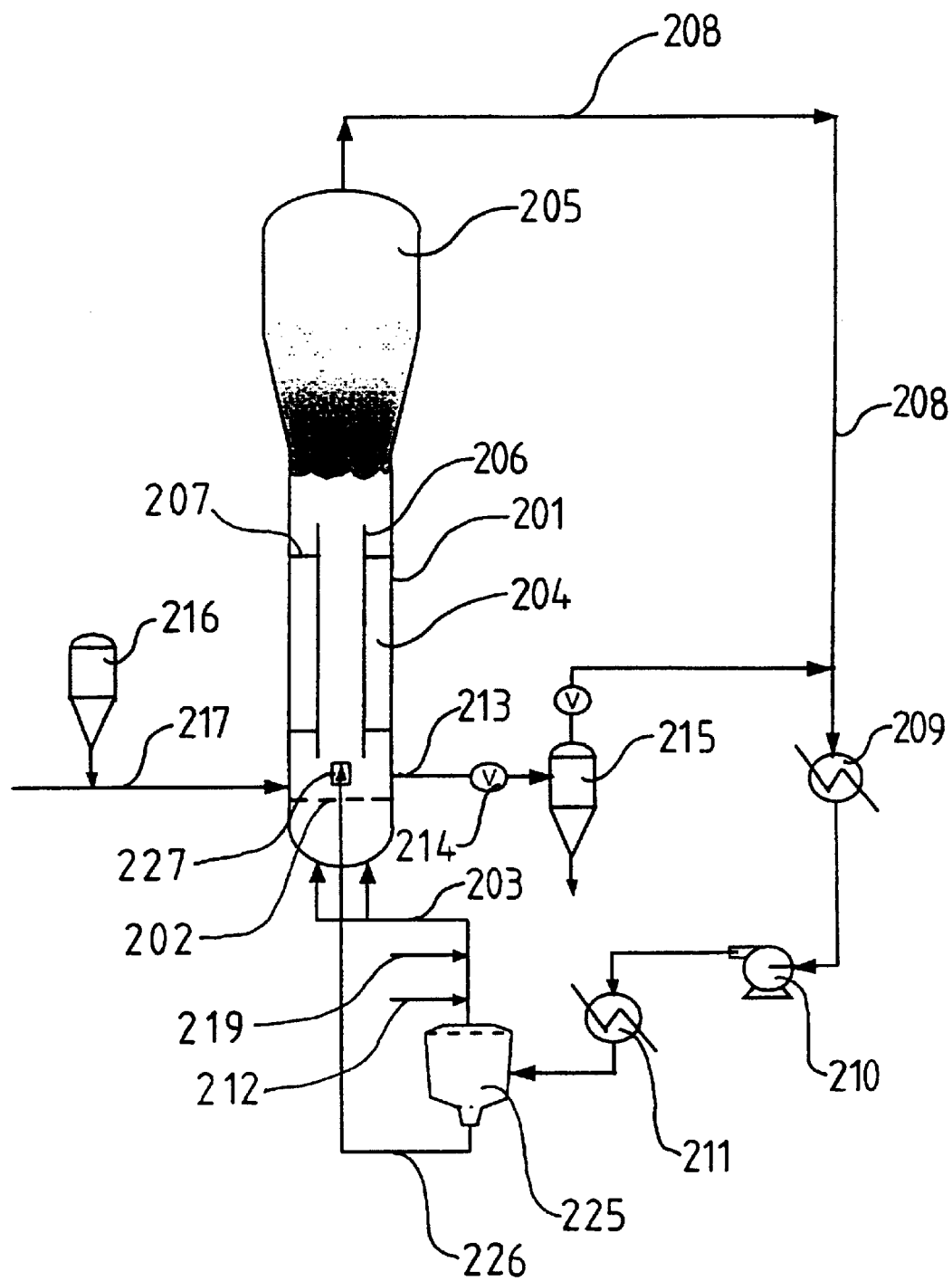
FIG. 2 is a similar arrangement which includes a second embodiment of the process of the invention in which gas and liquid are separately supplied to the reactor.

The arrangement in FIG. 2 differs from the one in FIG. 1 in that the two-phase stream that evolves in the second cooling step in heat exchanger 211 is passed to gas-liquid separator 225. In this separator gas and liquid in the two-phase stream are separated from each other. On adding make-up monomer and, optionally, inert gas via the feed lines 212 and 219, respectively, the separated gas stream is supplied to the bottom of reactor 201 via feed line 203. Via line 226, which extends through gas distribution plate 202 into the fluidised bed to just below the lower end of pipe 206, the separated condensed liquid stream is supplied to the fluidised bed via atomiser 227. Atomiser 227 atomises the liquid in the central reactor compartment which is located within pipe 206.

Figure 3:
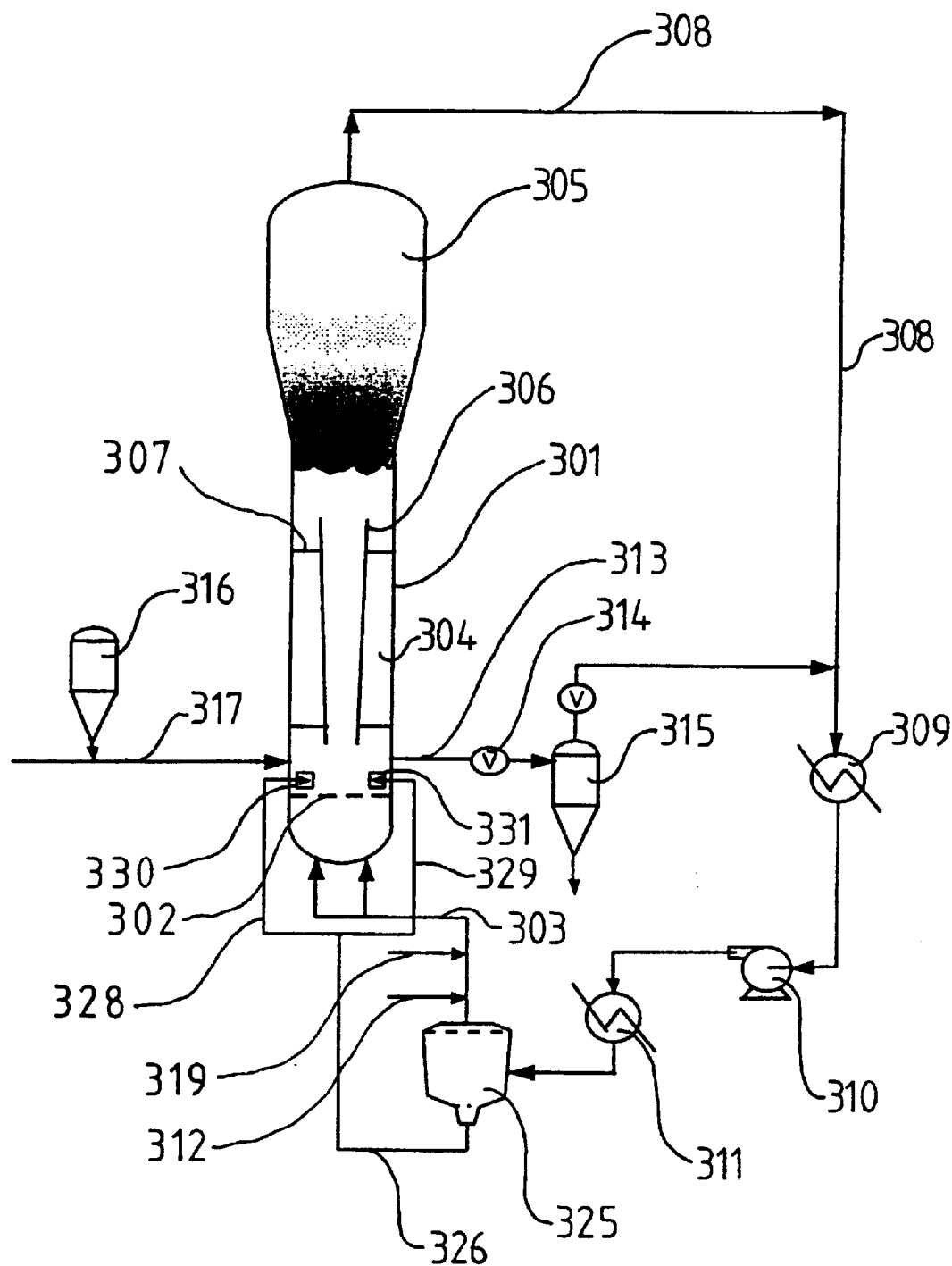
FIG. 3 is an arrangement as in FIG. 2, in which liquid is supplied through the wall of the reaction compartment and in which the tubular partition wall has a conical shape.

In FIG. 3, contrary to FIG. 2, the liquid separated in gas-liquid separator 325 is supplied to the fluidised bed via a number of lines whose ends are symmetrically arranged along the circumference of the reactor wall at a height between the gas distribution plate 302 and the lower end of pipe 306. Two such lines, 328 and 329, are shown in the figure. The lines pass through the reactor wall into reaction compartment 304 and are terminated with atomisers 330 and 331. Through these atomisers the liquid, finely atomised with the aid of fresh monomer as propellant, is introduced into the fluidised bed at such exit velocity that the liquid is entrained by the fluidised bed through the central compartment located within pipe 306. Also, pipe 306 has a conical shape here with an apex angle of 1.50. The conical shape is shown exaggerated in the purpose of clarity.

Figure 4:
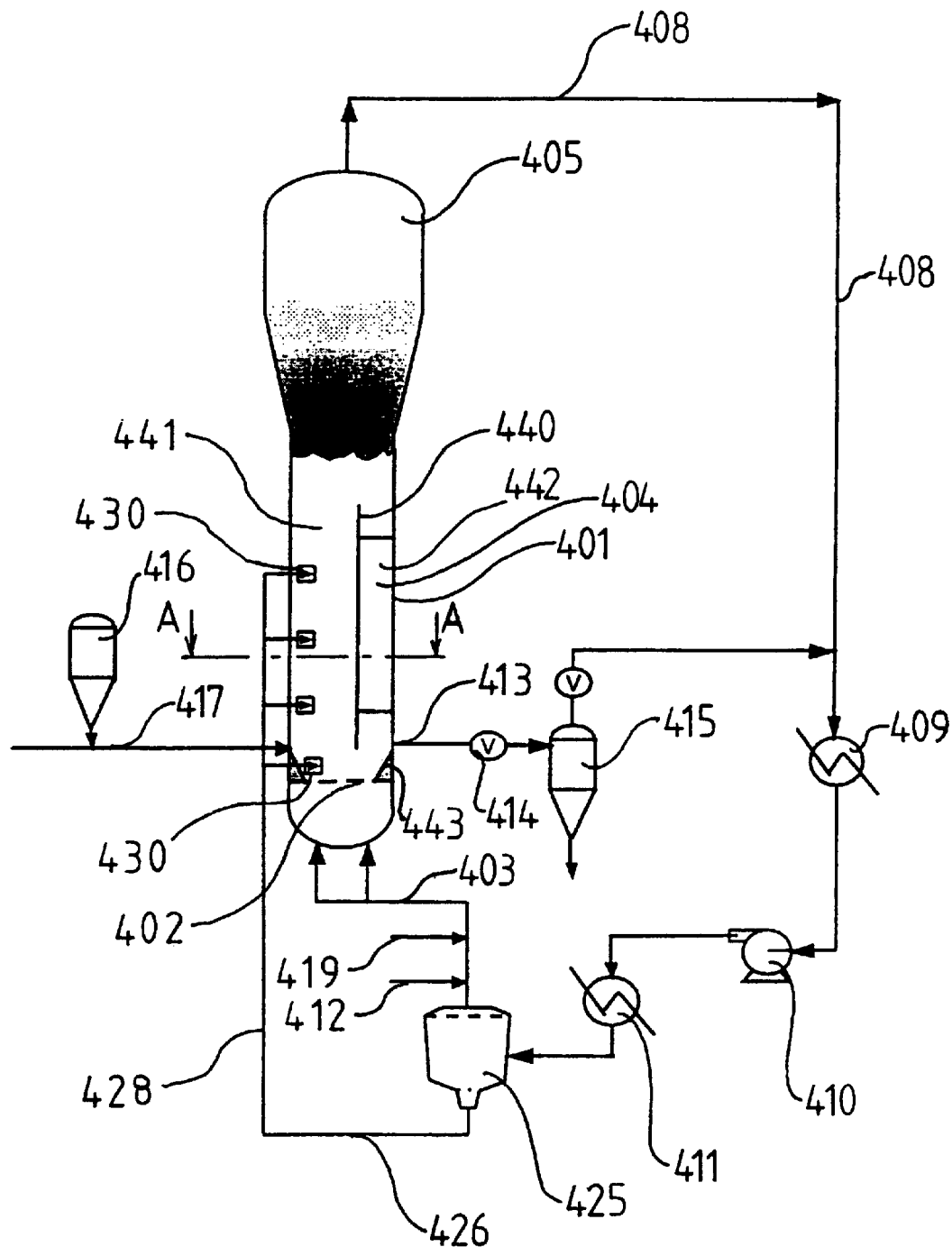
FIG. 4 is an arrangement as in FIG. 3 with a vertical plate serving as partition wall and in which liquid is introduced through the reactor wall at different heights.
Figure 5:
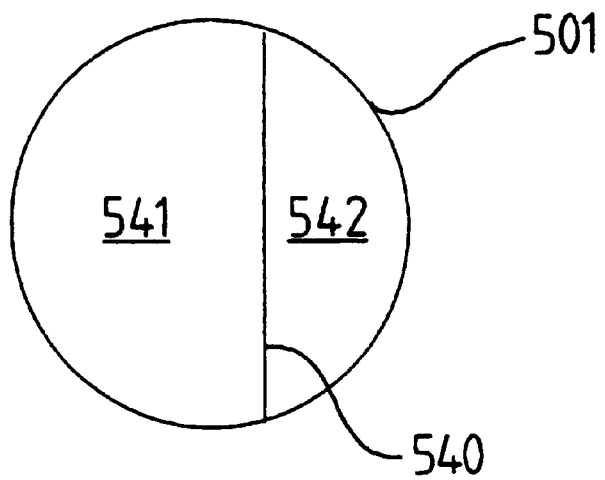
FIG. 5 is a radial cross section of the reactor in FIG. 4 along line A—A.

In FIG. 4, 440 is a vertical plate which serves as a partition wall to divide the reactor into two unequal compartments 441 and 442. A bird's eye view of this is shown in FIG. 5. In FIG. 4 a number of liquid inlets 430 pass through the reactor wall at different heights to terminate in compartment 441. Catalyst feed line 417 also terminates in this compartment. A gas-impervious screen 443 extends from gas distribution plate 402 along the inner circumference of the reactor to the reactor wall at an angle to the plate of 50°.

Figure 6:
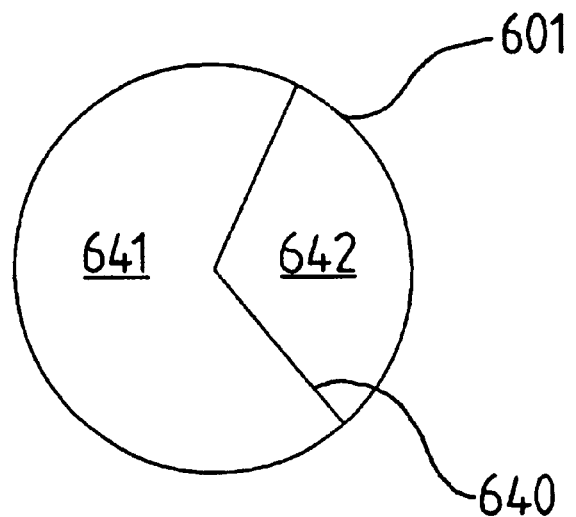
FIG. 6 is a similar cross section of a reactor in which a folded vertical plate serves as partition wall.

In FIG. 6, the partition wall plate 640 is folded.

The invention is further elucidated by means of the following computer simulated Examples and comparitive experiments, which are not meant to restrict the invention thereto.

EXAMPLES AND COMPARATIVE EXPERIMENTS

A continuous polymerisation of propylene to polypropylene is performed in a vertical, cylindrical fluidised bed reactor with an inner diameter of 0.85 m. The distance between the gas distribution plate and the top of the reactor is 8.5 m.; the fluidised bed has a height of 4.2 m.

As catalyst system, a fourth generation heterogeneous Ziegler/Natta catalyst system is used, the catalyst having an average particle size of 20 $\mu$m.

In all the Examples, a concentric cylindrical pipe with a diameter of 0.59 m., a length of 3.2 m., and a wall thickness of $2 \times 10^{-3}$ m., is placed in the fluidised bed, at 0.4 m. above the gas distribution plate. This pipe is absent in the comparative experiments.

The catalyst system, propylene, hydrogen, nitrogen (and an inert coolant) are continuously fed to the reactor; the off gas of the reactor is cooled to a temperature below its dewpoint and recirculated to the bottom of the reactor. A stream of polymer product is withdrawn from the bottom of the fluid bed. The superficial gas velocity in the fluid bed is maintained at 0.6 m/s.

During the polymerisation the maximum percentage of condensed mode (MCM, in %) is determined; this is the point at which operation of the reaction, and especially the reaction temperature, becomes unstable, and problems with the polymer withdrawal are encountered. The condensed mode ratio is the ratio of the weight of the liquid versus the weight of gas and liquid in the two-phase recycle stream to the reactor. The percentage of condensed mode can be varied by changing the cooling temperature of the recycle stream.

The process conditions and the resulting MCM and reactor productivity are given in Table I. In Examples I and III and comparative experiments A and B propylene is used as the condensable agent; in Example II a mixture of propylene and isobutane (IB) is used as the condensable agent; in Example IV a mixture of propylene and isopentane (IP) is used as the condensable agent. The composition of the gas phase is in-line monitored by means of gas chomatography.

TABLE I

| Example/ comp. exp. | Total Pressure (MPa) | $C_3$* Pressure (MPa) | $H_2$- Pressure (Mpa) | $N_2$- Pressure (Mpa) | IB/IP Pressure (Mpa) | Temp. Reactor (° C.) | MCM (%) | Temp. recycle (° C.) | Productivity (t/h) |
|---|---|---|---|---|---|---|---|---|---|
| I | 2.50 | 2.16 | 0.04 | 0.30 | — | 70 | 62 | 37 | 4.8 |
| II | 2.50 | 2.16 | 0.04 | 0.20 | 0.10 | 70 | 60 | 48 | 4.7 |
| III | 2.30 | 1.99 | 0.04 | 0.28 | — | 70 | 61 | 35 | 4.6 |
| IV | 2.30 | 1.99 | 0.04 | 0.07 | 0.21 | 70 | 58 | 44 | 4.6 |
| A | 2.50 | 2.16 | 0.04 | 0.30 | — | 70 | 22 | 47 | 1.5 |
| B | 2.30 | 1.99 | 0.04 | 0.28 | — | 70 | 21 | 44 | 1.4 |

From the data it can be seen that using a process of the present invention, and more specific using the reactor system of the present invention, results in a sharp increase in the applicable condensed mode, as a result of which a much higher reactor productivity is achieved.

What is claimed is:

1. A process for forming a polymer comprising:
   polymerizing at least one monomer in a fluidized bed reactor operated in condensed mode, wherein the reactor has a reaction zone comprising at least one partition wall oriented substantially parallel to the longitudinal axis of the reactor.

2. The process according to claim 1, wherein the partition wall has the shape of a pipe or hollow section.

3. The process according to claim 2, wherein the pipe or hollow section is concentric with the reaction zone.

4. The process according to claim 1, wherein the partition wall is a flat, curved or folded plate.

5. The process according to claim 1, wherein the fluidized bed has a ratio (H/D) of the height (H) of the bed to the diameter (D) of the radial cross section of the bed, greater than 5.0.

6. The process according to claim 1, wherein a gas withdrawn from the reactor is at least partially condensed and recycled to the reactor as a gas-liquid mixture.

7. The process according to claim 6, wherein at least a portion of the liquid in the recycled gas-liquid mixture is separately introduced into the reactor.

8. The process according to claim 6, wherein the mass ratio of liquid to gas in the recycled gas-liquid mixture is higher than 2:1.

9. The process according to anyone claim 1, wherein the polymerization is performed at a pressure between 0.5 and 10 MPa.

10. The process according to claim 1, wherein the polymerization is performed at a temperature between 30 and 130° C.

11. The process according to claim 7, wherein the at least one partition wall has the shape of a pipe or hollow section, defining a central compartment within said reactor and, wherein the bulk of said liquid separately introduced into the reactor is introduced into said central compartment.

12. The process according to claim 7, wherein the at least one partition wall is a flat, curved or folded plate having a lower end, and wherein at least a portion of said liquid separately introduced into the reactor is introduced into the reactor from below the lower end of the plate.

13. The process according to claim 6, wherein the mass ratio of liquid to gas in the recycled gas-liquid mixture is higher than 4:1.

14. The process according to claim 7, wherein the mass ratio of liquid to gas in the recycled gas-liquid mixture is higher than 4:1.

15. The process according to claim 1, wherein said at least one monomer comprises an olefin monomer.

16. The process according to claim 1, wherein said olefin monomer is ethylene or propylene or mixture thereof.

17. The process according to claim 16, wherein said olefin monomer is copolymerized with another alpha-olefin, and wherein ethylene and/or propylene comprise at least 70 weight percent of the total monomers.

18. The process according to claim 1, wherein the polymerization is performed at a pressure between 1 and 5 MPa.

19. process according to claim 18, wherein the polymerization is performed at a temperature between 45° C. and 110° C.

20. The process according to claim 1, wherein the polymerization is performed at a temperature of between 45° C. and 110° C.

21. The process according to claim 2, wherein the fluidized bed reactor includes a gas distribution plate, located below said at least one partition wall.

22. The process according to claim 21, wherein the pipe or hollow section has a lower end and an upper end, and wherein the lower end is located at least 0.1×the diameter of the reaction zone above the gas distribution plate and up to 3×the diameter of the reaction zone above the gas distribution plate.

23. The process according to claim 21, wherein the upper end of the pipe or hollow section is located at least 0.1×the diameter of the reaction zone below the end of the reaction zone and up to 3×the diameter of the reaction zone below the end of the reaction zone.

* * * * *